(12) United States Patent
Beebe

(10) Patent No.: US 7,556,239 B2
(45) Date of Patent: Jul. 7, 2009

(54) SLOW CLOSE VALVE

(75) Inventor: Patrick Allen Beebe, Jackson, MI (US)

(73) Assignee: Colonial Engineering, Inc., Portage, MI (US)

( * ) Notice: Subject to any disclaimer, the term of this patent is extended or adjusted under 35 U.S.C. 154(b) by 210 days.

(21) Appl. No.: 11/652,292

(22) Filed: Jan. 11, 2007

(65) Prior Publication Data

US 2008/0169441 A1  Jul. 17, 2008

(51) Int. Cl.
*F16K 31/44* (2006.01)
(52) U.S. Cl. .................................... 251/248; 251/291
(58) Field of Classification Search ............. 251/291, 251/293, 248, 128; 137/382.5, 368–371
See application file for complete search history.

(56) References Cited

U.S. PATENT DOCUMENTS

| | | | | |
|---|---|---|---|---|
| 1,181,565 A | * | 5/1916 | Block | ............ 81/124.2 |
| 1,239,704 A | * | 9/1917 | Lee et al. | ............ 220/259.3 |
| 1,756,650 A | * | 4/1930 | Martin, Jr. | ............ 251/183 |
| 1,759,221 A | * | 5/1930 | Carson | ............ 137/364 |
| 2,025,244 A | | 12/1935 | Morehead et al. | |
| 3,537,471 A | * | 11/1970 | Houle | ............ 137/370 |
| 3,891,181 A | * | 6/1975 | Sanders | ............ 251/128 |
| 4,030,696 A | * | 6/1977 | Bake et al. | ............ 251/288 |
| 6,089,253 A | * | 7/2000 | Stehling et al. | ............ 137/296 |
| 6,131,604 A | * | 10/2000 | Harriss | ............ 137/382.5 |
| 6,378,841 B1 | | 4/2002 | Russell | |
| 7,117,883 B1 | * | 10/2006 | Vitalo | ............ 137/366 |
| 2003/0033867 A1 | * | 2/2003 | Posey et al. | ............ 73/168 |

* cited by examiner

Primary Examiner—John K Fristoe, Jr.
Assistant Examiner—Marina Tietjen
(74) Attorney, Agent, or Firm—Flynn, Thiel, Boutell & Tanis, P.C.

(57) ABSTRACT

A quarter turn valve includes a tubular body having a bore flow passage, a valve element having a through flow passage, the valve element being supported in the through flow passage for rotation about an axis transverse to the through flow passage. The through flow passage is aligned with the bore flow passage to permit flow when the valve element is positioned at a first end of the quarter turn and is misaligned with the bore flow passage to prevent flow when the valve element is at a second end of the quarter turn. A motion multiplication device is included for facilitating a slow operation of the valve element. A tool engaging configuration is provided on the handle for facilitating a remote operation of the handle.

12 Claims, 3 Drawing Sheets

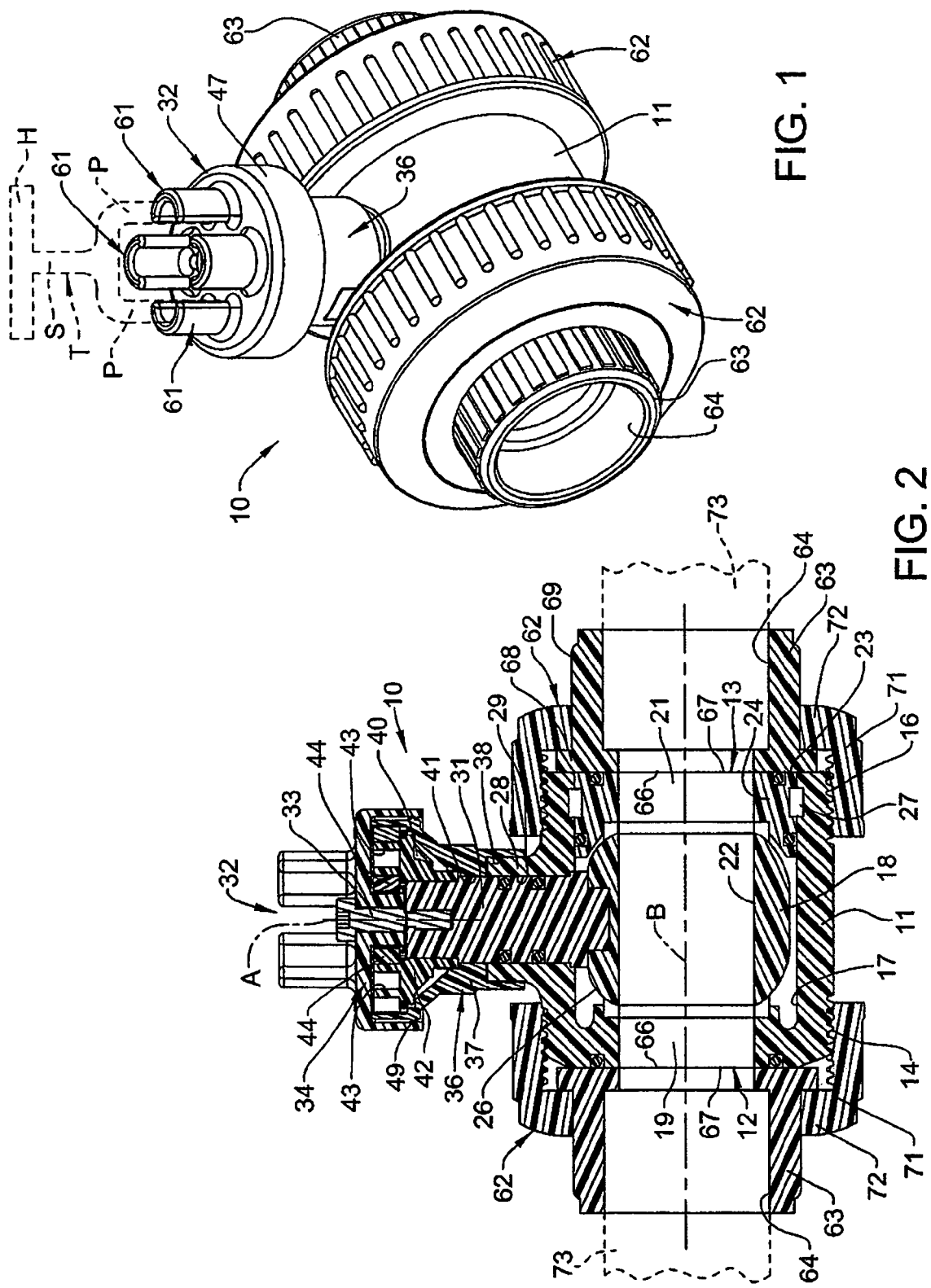

SLOW CLOSE VALVE

FIELD OF THE INVENTION

This invention relates to an improvement in an all plastic ball valve having a feature facilitating operation thereof in a down-hole environment.

BACKGROUND OF THE INVENTION

Ball valves are well known in the field, including ball valves that are operated by a handle and the speed of movement of the valve element is determined by a motion multiplication means oriented between the handle and the valve element. U.S. Pat. Nos. 2,025,244 and 6,378,841 are just a few of the representative examples thereof.

It is widely known that ball valves made entirely of metallic components are subject to corrosion, especially when the valves are oriented in a buried application, usually in a hole provided in the earth's surface, which hole is then capped. Access to a buried valve is gained by uncapping the hole and, in some situations, using a tool to facilitate operation thereof. When the valves are made of metallic components, such as brass, they become corroded over time and difficult to operate, thereby necessitating replacement.

Accordingly, it is an object of this invention to provide a primarily non-metallic ball valve that includes a motion multiplication means in the form of a planetary gear system oriented between a handle and a valve element actuation stem so that one 360° rotation of the handle will effect a 90° rotation of the valve element.

It is a further object of the invention to provide a non-metallic ball valve, as aforesaid, wherein the handle of the valve includes a down-hole operation feature.

It is a further object of the invention to provide a structure for slowly opening and closing the valve so as to prevent the occurrence of water hammer or shock.

SUMMARY OF THE INVENTION

The objects and purposes of the invention have been met by providing a valve which includes a tubular body having a bore flow passage, a valve element having a through flow passage, the valve element being supported in the through flow passage for rotation through a quarter turn about an axis transverse to the through flow passage. The through flow passage is aligned with the bore flow passage to permit flow when the valve element is positioned at a first end of the quarter turn and is misaligned with the bore flow passage to prevent flow when the valve element is at a second end of the quarter turn. An actuating valve stem and a manually engageable handle secured thereto are provided for selective slow operation of the actuating valve stem through a quarter-turn input motion for effecting opening or closing of the valve element to permit or prevent flow. A motion multiplication device is provided between the handle and the valve element and is operated by rotation of the handle. A tool engaging configuration is provided on the handle for facilitating a remote operation of the handle. The tool engaging configuration includes at least one upstanding embossment on an upwardly facing surface of the handle configured to engage with a tool to facilitate remote operation of said handle.

BRIEF DESCRIPTION OF THE DRAWINGS

Other objects and purposes of the invention will be apparent to persons acquainted with apparatus of this general type upon reading the following specification and inspecting the accompanying drawings, in which:

FIG. 1 is an isometric view of a first embodiment of the ball valve embodying the invention;

FIG. 2 is a central sectional view thereof;

DETAILED DESCRIPTION

Figure 3:
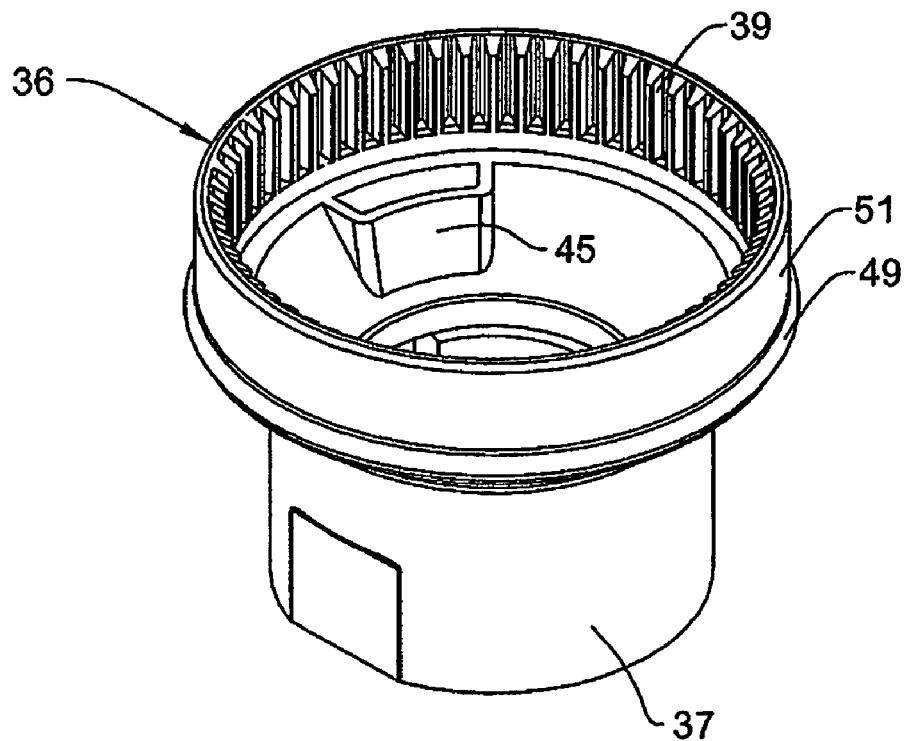
FIG. 3 is an isometric view of the ring gear of a planetary gear system.
Figure 4:
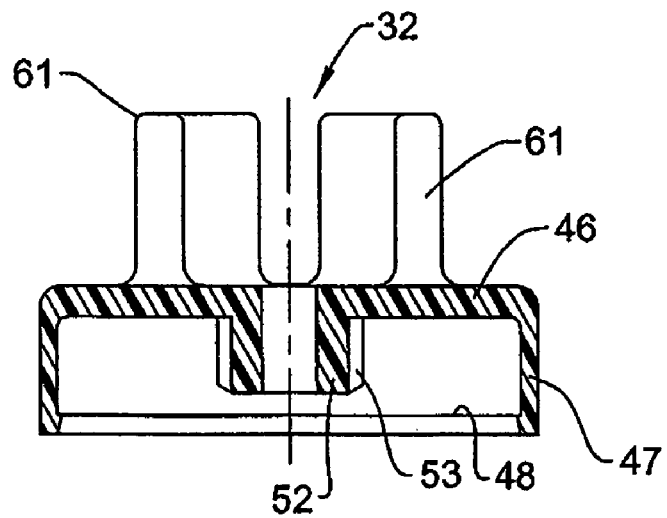
FIG. 4 is a central sectional view of the handle.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

Figure 5:
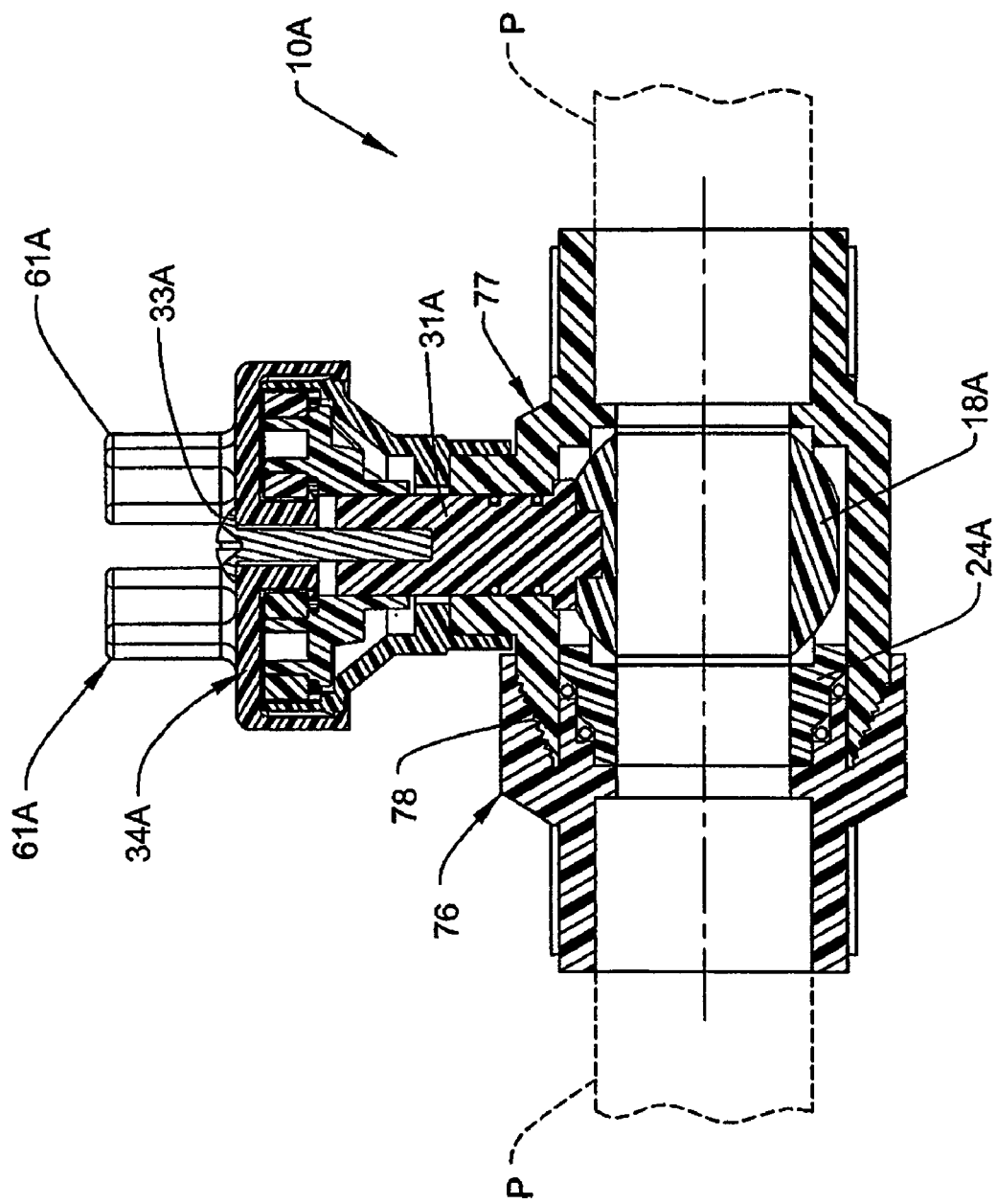
FIG. 5 is a central section of a modified valve body facilitating a direct connection of pipe to the valve body without resorting to the use of the union nut connections illustrated in the embodiment of FIGS. 1-4.

A first embodiment of a ball valve 10 embodying the invention is illustrated in FIGS. 1-4. A second embodiment of a ball valve 10A is illustrated in FIGS. 5-6.

Referring now to the first embodiment illustrated in FIGS. 1-4, the ball valve 10 includes a valve body 11 having an elongate cylindrical tubular configuration. Each end 12, 13 of the valve body has an external thread 14, 16, respectively, formed on the radially outwardly facing surface thereof. The hollow interior of the valve body 11 defines a chamber 17 wherein the internal wall construction is configured to rotatably support a ball valve member 18 for rotation about an axis A perpendicular to the longitudinal axis of the valve body 11. In this particular embodiment, the ball valve member 18 is oriented approximately midlength of the elongate valve body 11. Coaxial bore flow openings 19 and 21 are provided at the ends 12 and 13, respectively, to provide communication to the chamber 17. The ball valve member 18 includes a through bore flow passageway 22 that is coaxially aligned with the openings 19 and 21 in the valve body 11 as best illustrated in FIG. 2. In this particular embodiment, and in order to facilitate installation of the ball valve member 18 into the chamber 17, the valve body 11 includes an opening 23 at the end 13 that is larger in dimension than the dimension of the ball valve member 18. A sleeve 24 having the aforesaid opening 21 therethrough is configured to be received into the opening 23 after the ball valve member 18 has been positioned inside the chamber 17. The inner end of the sleeve 24 is configured to slidingly and sealingly engage the outer surface 26 of the ball valve member 18 in a manner similar to the way that the ball valve member 18 sealingly engages the inwardly facing portion of the chamber 17 immediately surrounding the opening 19 at the end 12. The sleeve 24 is locked in its illustrated position via a key 27.

The valve body 11 includes a radially outwardly extending embossment 28 oriented at about the midlength portion thereof as illustrated in FIG. 2. The embossment 28 includes an opening 29 through the central portion thereof and opening into the chamber 17. A cylindrical stem 31 is rotatably supported in the opening 29 for rotation about the axis A and with one end thereof fixedly connected to the ball valve member 18. In this particular embodiment, the longitudinal axis of the stem 31 intersects and is oriented perpendicular to the axis B of the opening 22 through the ball valve member 18. A plurality of annular o-ring grooves are provided in the interior wall surface of the opening 29 of the embossment 28 and each are configured to receive an o-ring therein that is configured to form a seal with the rotatable stem 31.

A manually operable handle 32 is rotatably mounted to and with respect to the upper end of the stem 31 via a screw 33, preferably a stainless steel screw. A planetary gear arrangement 34 is oriented between the rotatable handle 32 and the rotatable stem 31. More specifically, a ring gear member 36 of the planetary gear arrangement 34 is fixedly secured to the embossment 28. The ring gear member 36 is illustrated in FIG. 3 and includes a sleeve component 37 that includes a recessed portion 38 of the sleeve that encircles and is fixedly secured to the outer surface of the embossment 28. The ring gear includes a plurality of gear teeth 39 facing radially inwardly of the sleeve 37. The ring gear 36 also includes a central opening 41 through which extends the rotatable stem 31. An internal wall surface of the central opening 41 of the ring gear member 36 includes at least one radially inwardly projecting abutment 45 (FIG. 3).

A planet gear support member 42 is fixedly secured to the stem 31 and is rotatable therewith. The planet gear support member 42 includes a plurality of, here four, upstanding axles 43 on each of which is rotatably supported a planet gear 44 whose gear teeth mesh with the gear teeth 39 of the ring gear. The planetary gear support member 42 also includes a radially outwardly extending stop 40 configured to engage the abutment 45 to limit the rotational travel thereof to a 90° clockwise and counter-clockwise movement to assure proper movement of the ball valve member 18 and orientation thereof at the fully open and fully closed positions thereof.

The handle 32 includes a horizontally extending top wall 46 having at the radially outer extremity thereof a downwardly extending skirt 47. The radially inner surface of the skirt 47 has an inwardly projecting lip 48 configured to become oriented beneath a radially outwardly extending annular projection 49 on the ring gear 36. In other words, the handle 32 is configured to encircle an upstanding wall 51 supporting the teeth 39 of the ring gear 36 and the skirt 47 is configured to elastically yield to allow the lip 48 to pass the annular projection 49 so that the handle will be snap locked onto and rotatable with respect to the ring gear 36. This snap lock feature also forms a labyrinth seal to prevent dirt and the like from being able to enter the region whereat the planetary gear arrangement 34 is located. The handle 32 also includes a downwardly extending and centrally oriented embossment 52 on which is oriented a plurality of gear teeth 53 serving as the sun gear of the planetary gear arrangement. The teeth 53 of the sun gear operatively engage the teeth on each of four planet gears 44.

As is illustrated in FIG. 1, the skirt 47 of the handle 32 is circular in cross section. In order to facilitate operation of the handle 32, especially in a down hole environment such as an underground water supply system to a sprinkler arrangement as might be present on a golf course or the like, a plurality of upstanding embossments 61 are provided on the upper surface of the top wall 46 of the handle 32. In this particular embodiment, each of the embossments 61 are generally identical with the others and are of an arcuate C-shape configuration. More specifically, there are provided four embossments 61, each generally C-shaped in cross section with each embossment being oriented so as to oppose on a diameter another embossment so that the openings formed between the legs of the C-shape face each other. A conventional tool T (FIG. 1) can, if desired, be utilized for operative engagement with the embossments 61. The tool T includes a handle H at one end of a stem S and a pair of prongs P at the end of the stem S remote from the handle H. The prongs P are configured to be received into the region between the legs on a pair of diametrically opposing C-shaped embossments 61 as illustrated in FIG. 1. The tool T will facilitate operation of the ball valve 10 by rotation of the handle H which will, in turn, impart rotation of the handle 32 to cause the teeth 53 of the sun gear to rotate thereby imparting rotation of the planet gears 44 to impart a rotational movement of the planet gear support 42 and thence a rotation of the stem 31.

In this particular-embodiment, the gear ratio of the planetary gear arrangement 34 is four to one. This means that with one complete 360° revolution of the handle 32, the planet gear support member 42 will rotate through 90° thereby causing the opening 22 through the central portion of the ball valve member 18 to rotate to a position that is 90° from the position illustrated in FIG. 2. The ball valve member 18 in the aforesaid position will prevent the flow of liquid through the bore flow passage 22 of the ball valve member.

Conventional pipe union joints 62 are provided at each of the ends 12 and 13 of the ball valve member. Each pipe union joint 62 is composed of a hollow sleeve member 63 having an axially extending through opening 64 configured to become coaxially aligned with the openings 19 and 21 of the valve body 11. Each sleeve 63 includes an axially facing flat end surface 66 configured to abut against a flat surface 67 of the valve body 11 or a combination of an end surface of the valve body 11 and end surface of an axially facing surface of the sleeve 24. Furthermore, the flat end face 66 extends radially outwardly as at 68 beyond a peripheral surface 69 of the sleeve portion 63. At least one annular o-ring groove is provided in the periphery of the sleeve 24 and is configured to receive therein an o-ring for forming a seal with the internally facing surface of the opening 23. Similarly, an annular o-ring groove is provided in the end face 67 of the sleeve 24 and is configured to receive therein an o-ring for forming a seal with the flat end face 66.

An internally threaded nut 71 is provided and the internal threads thereof are intended to mate with a selected one of the external threads 14 and 16 on the valve body 11. The nut includes a radially inwardly extending flange 72 that abuts the axially outwardly facing surface of the flat wall 68 so that the flat wall 68 will be clamped between the flange 72 and the end face 67 of the valve body and/or combination of valve body and sleeve 24. Conventional conduit 73 is configured to be received in the opening 64 of the sleeve 63 and be secured therein via a conventional adhesive.

An alternate ball valve 10A is illustrated in FIG. 5. Since the components of the ball valve 10A are nearly identical to the ball valve 10, and to minimize duplicative descriptive text, the same reference numbers for the components described for the ball valve 10 will be utilized in the embodiment of FIG. 5 but will have the suffix "A" added thereto. More specifically, the valve body 11A is comprised of two parts 76 and 77 that are threadedly connected together as at 78. A sleeve 24A is captured between the two parts 76 and 77 and operatively cooperates with the outer surface 26A of the ball valve member 18A as described above. The primary difference between the embodiment of FIGS. 1-4 and the embodiment of FIG. 5 is that the union joint connections 62 have been replaced with appropriately sized sockets 81 and 82 in the respective parts 76 and 77 of the valve body 11A which are configured to snuggly receive therein conformingly sized pipe P. In other words, pipe P (shown in broken lines in FIG. 5) configured to be snuggly received in the respective sockets 81 and 82 can be adhesively secured directly to the respective body parts 76 and 77 using conventional pipe adhesive for a permanent installation.

The components of the ball valve 10 discussed above are made of a synthetic resin material, particularly polyvinylchloride (PVC). The purpose of this construction is to eliminate metallic componentry so that corrosion will not become an issue during usage thereof. This becomes especially important when the ball valve member 10 is oriented in an underground location, such as a water supply system in an underground sprinkling system as might be employed on golf courses or the like.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. In a valve comprising a tubular body having a bore flow passage, a valve element having a through flow passage, said valve element being supported in said through bore flow passage for rotation through a quarter turn about an axis transverse to said through flow passage, wherein said through flow passage is aligned with said bore flow passage to permit flow when said valve element is positioned at a first end of the quarter turn and is misaligned with said bore flow passage to prevent flow when said valve element is at a second end of the quarter turn, an actuating valve stem and a manually engageable handle secured thereto for selective operation of said actuating valve stem through a quarter-turn input motion for effecting opening or closing of said valve element to permit or prevent flow and a motion multiplication means operated by rotation of said actuating valve stem, wherein the improvement comprises:

a tool engaging configuration on said manually engageable handle for facilitating a remote operation of said handle, said tool engaging configuration comprising four separately upstanding arcuately spaced embossments forming a circular array, each embossment having at least an upwardly opening socket, at least two of said sockets being configured to receive therein a fragment of the same tool.

2. The valve according to claim 1, wherein said valve element is a ball valve.

3. The valve according to claim 1, wherein the motion multiplication means is a four-to-one motion multiplier.

4. The valve according to claim 3, wherein said motion multiplication means includes a unitary cup shaped member with an upstanding wall, said upstanding wall having on an inwardly facing side thereof an integrally provided ring gear, said unitary cup shaped member being fixed to said tubular body, a planetary gear support fixed to said actuating valve stem, a plurality of planet spur gears rotatably supported on said planetary gear support, each planet gear engaging said ring gear, said manually engageable handle comprising an inverted cup shaped member having a top wall and a downwardly depending annular skirt, said manually engageable handle being mounted on said unitary cup shaped member and being rotatable with respect thereto and having a sun gear integral with said top wall residing in said inverted cup shaped member and engaging each of said plurality of planet gears.

5. The valve according to claim 4, wherein each rotation of said sun gear will cause a one-quarter rotation of said actuating valve stem.

6. The valve according to claim 1, wherein said at least two of said sockets are diametrically spaced from each other in said circular array.

7. The valve according to claim 1, wherein each of said four separately upstanding arcuately spaced embossments is C-shaped in cross section, an open part of each C-shape opening radially inwardly of said circular array.

8. The valve according to claim 1, wherein all of the aforesaid components are made entirely of a synthetic resin material.

9. The valve according to claim 8, wherein said synthetic resin material is polyvinylchloride.

10. In a valve comprising a tubular body having a bore flow passage, a valve element having a through flow passage, said valve element being supported in said through bore flow passage for rotation through a quarter turn about an axis transverse to said through flow passage, wherein said through flow passage is aligned with said bore flow passage to permit flow when said valve element is positioned at a first end of the quarter turn and is misaligned with said bore flow passage to prevent flow when said valve element is at a second end of the quarter turn, an actuating valve stem and a manually engageable handle secured thereto for selective operation of said actuating valve stem through a quarter-turn input motion for effecting opening or closing of said valve element to permit or prevent flow and a motion multiplication means operated by rotation of said actuating valve stem, wherein the improvement comprises:

said motion multiplication means being a planetary gear system having a unitary cup shaped member with an upstanding wall, said upstanding wall having on an inwardly facing side thereof an integrally provided ring gear, said unitary cup shaped member being fixed to said tubular body, a planetary gear support fixed to said actuating valve stem, a plurality of planet spur gears rotatably supported on said planetary gear support, each planet gear engaging said ring gear, a unitary handle member comprising an inverted cup shaped member having a top wall and a downwardly depending annular skirt, said unitary handle member being mounted on said unitary cup shaped member and being rotatable with respect thereto and having a sun gear integral with said top wall residing in said inverted cup shaped member and engaging each of said plurality of planet gears.

11. The valve according to claim 10, wherein said unitary cup shaped member has a radially outwardly extending annular projection located on a peripheral surface of said upstanding wall and spaced from a rim of said unitary cup shaped member, said annular skirt has at a lower edge thereof a radially inwardly extending, elastically yieldable, lip having an inner diameter less than the outer diameter of said annular projection, said annular lip on said annular skirt being configured to yield radially outwardly as said annular projection is urged therepast in response to a mounting of said unitary handle member on said unitary cup shaped member to cause said annular lip to contract to form a seal with said annular projection.

12. The valve according to claim 10, wherein said manually engageable handle includes a tool engaging configuration for facilitating a remote operation of said handle, said tool engaging configuration comprising at least one upstanding embossment on an upwardly facing surface of said handle configured to engage with a tool to facilitate remote operation of said manually engageable handle.

* * * * *